May 23, 1972  J. I. BERRY  3,664,711

VEHICLE SPEED SYNTHESIZER

Filed Jan. 19, 1970

INVENTOR:
JAMES I. BERRY
BY:
ATTORNEYS

United States Patent Office 3,664,711
Patented May 23, 1972

3,664,711
VEHICLE SPEED SYNTHESIZER
James I. Berry, Livonia, Mich., assignor to Ford Motor Company, Dearborn, Mich.
Filed Jan. 19, 1970, Ser. No. 3,666
Int. Cl. B60k 8/08
U.S. Cl. 303—21 BE
4 Claims

ABSTRACT OF THE DISCLOSURE

A speed synthesizer for measuring the translational velocity of a moving body at any instant during a period of acceleration or deceleration including an inertia sensor, suitable amplifiers and impedance buffers on the output side of the inertia sensor, a capacitor storage subcircuit receiving the output voltage signal of the impedance buffers and an integrator circuit adapted to receive and integrate the stored voltage potential in said storage subcircuit beginning at the instant the acceleration or deceleration mode begins.

GENERAL DESCRIPTION OF THE INVENTION

The improvement of my invention can be used readily in an antiskid brake control system for the wheel brakes on an automotive vehicle. The signal developed by my improved vehicle speed synthesizer can be used as one of the input parameters for the control system to effect controlled wheel slippage during application of the wheel brakes.

The improvement of my invention includes a piezoelectric detector for determining acceleration and deceleration forces. This detector produces a signal that is proportional to the deceleration of the vehicle when it is properly mounted on the vehicle. The deceleration signal is amplified as it is distributed through suitable impedance buffers before it is distributed to an integrator circuit. The integrator output is a signal that is proportional to the vehicle velocity. That signal is combined with a vehicle wheel speed signal developed by a suitable wheel velocity pick-up device. The two signals then are added algebraically by an operational amplifier to produce a signal that is proportional in magnitude to the difference between the synthesized velocity signal and the wheel speed velocity signal. This difference, of course, is an indication of wheel slippage during braking.

The improved deceleration sensor of my invention can be used in the circuit described in the copending application of Zbigniew J. Jania and Lawrence J. Vanderberg, Ser. No. 3,122, filed Jan. 15, 1970, which is assigned to the assignee of my invention. A piezoelectric material capable of being adapted for my sensor detector is described in a product description booklet published by Clevite Corporation, Piezoelectric Division, Bedford, Ohio, entitled "Piezoelectric Technology Data for Designers," copyright 1965.

PARTICULAR DESCRIPTION OF THE INVENTION

Figure 1:
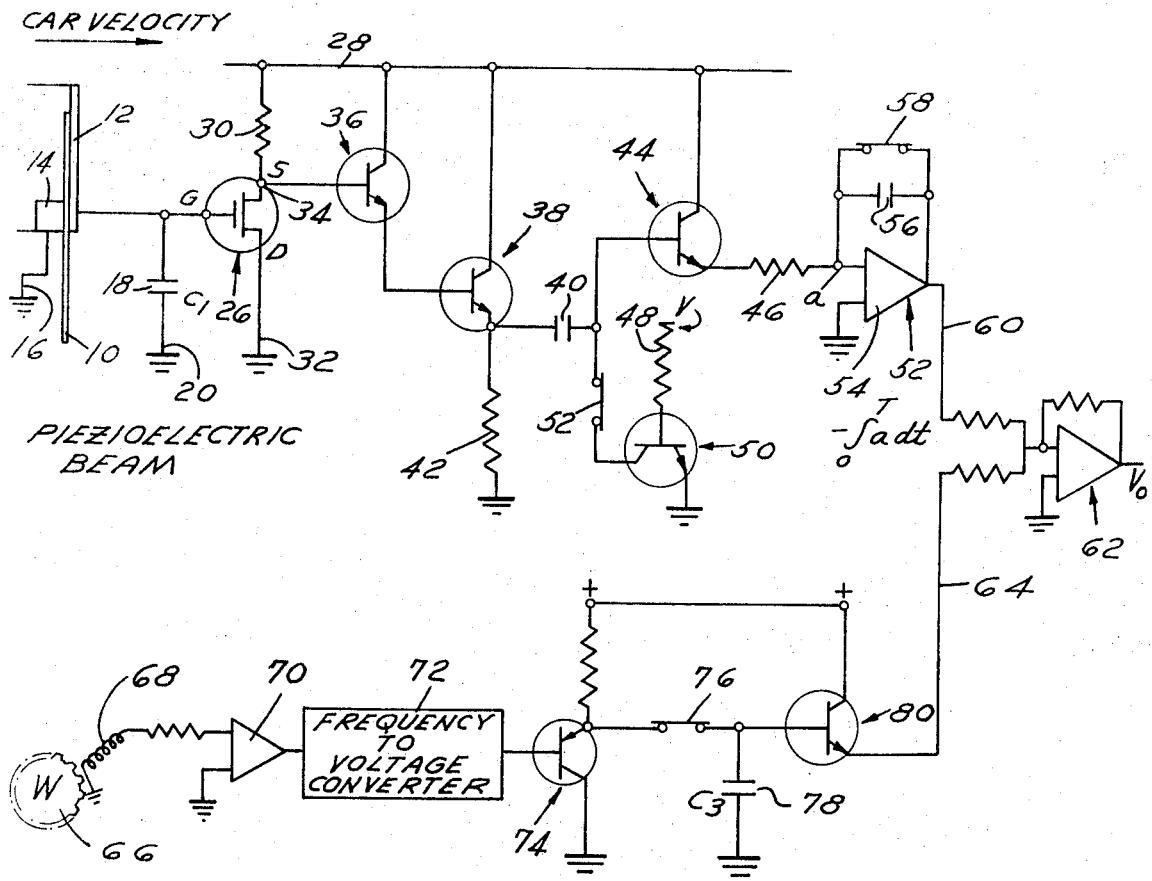
FIG. 1 illustrates in schematic form an electronic circuit embodying the features of my invention. It is adapted to be used in an antiskid brake system for an automotive vehicle.

Numeral 10 indicates a piezoelectric beam comprising two face-shear plates. The crystal material from which the beam is formed is capable of being twisted or bent in response to acceleration or deceleration forces.

In the diagram I have shown the beam in a vertical position in the vehicle. Its upward portion is supported by a first support plate 12. A second support plate 14 is secured against the beam 10.

The plate 14 is grounded at 16. The plate 12 is connected to one side of the capacitor 18, the other side being grounded at 20.

A voltage potential exists between support plates 14 and 12 when the beam is stressed as it would be if it were subjected to acceleration or deceleration forces. Such forces occur during the braking mode of operation of a wheeled vehicle.

Figure 2:
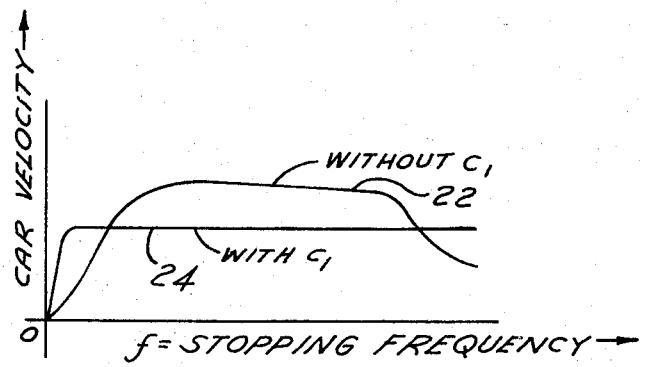
FIG. 2 is a chart showing the shape of the output voltage signal for the deceleration sensor of FIG. 1.

In FIG. 2 I have illustrated the relationship between the induced voltage of beam 10 and stopping frequency. At relatively high frequencies, the voltage remains relatively constant as indicated by curve 22. At low frequencies, the voltage build-up is relatively gradual.

In order to increase the rate of response of the piezoelectric beam 10 to deceleration forces, the capacitor 18 is used as shown. Its capacitance $C_1$ changes the shape of the curve for the effective voltage supplied by the piezoelectric material. This change is indicated by the curve 24 in FIG. 2. The curve 24 has a relatively fast rising characteristic at very low frequencies. It reaches an optimum peak value that is lower than the peak value of curve 22, but it is still a useful signal. The usefulness of the signal is extended throughout the frequency range including the lower frequencies.

The input side of the capacitor 18 is connected to the insulated gate of a field-effect transistor 26. The sink of the transistor 26 is connected to supply line 28 through a suitable control resistor 30. The drain side of the transistor 26 is connected to the ground as shown at 32.

The source voltage at point 34 is equal to the gate voltage because of the source-follower characteristic of transistor 26.

The source for the transistor 26 is connected to the base of an NPN emitter-follower transistor 36.

The magnitude of the signal developed by the piezoelectric beam 10 is proportional to acceleration or deceleration. Thus the height of the curve 24 would be increased as acceleration or deceleration increases. This signal is amplified by the high input impedance transistor 26 thereby making the voltage at point 34 a useful acceleration signal output.

The transistor 36 and a second emitter-follower transistor 38 act as impedance buffers to lower the accelerometer output impedance. The collector of the transistor 36 and the collector of the transistor 38 are connected to the same line 28. The emitter of the transistor 36 is connected to the base of transistor 38 and the emitter of transistor 38 is connected to one side of capacitor 40. A control resistor 42 is situated between the emitter for transistor 38 and the ground.

An output transistor 44 has its collector connected to the supply line 28 and its base connected to the output side of the capacitor 40. The emitter for transistor 44 is connected to control resistance 46 on the output side of the circuit.

In order to induce an instantaneous response to even a very slight acceleration or deceleration, it is necessary to compensate for the base-emitter voltage bias for the transistor 44. This is done by using a separate control voltage source V as at point 48. This is connected through a control resistance to the base of transistor 50, the emitter for which is grounded. The collector for the transistor 50 is connected through a switch 51 to the output side of the capacitor 40.

The collector voltage for transistor 50 is a reference voltage for the transistor 44 and the capacitor 40. This reference voltage is used rather than a zero voltage.

As soon as the brakes are applied, the switch 51 opens. This isolates the capacitor 40. The deceleration signal that is present when the brakes are applied immediately induces a response in the output transistor 44 as emitter current is transmitted to the resistor 46. The input side of the capacitor 40 is subjected to the same voltage that appears at point 34 at the sink of the transistor 26. This is due to the fact that both transistors 36 and 38 are emitter-follower transistors.

The voltage at the output side of transistor 44 is an indicator of vehicle deceleration. If that signal is integrated during the braking mode, it will provide an instantaneous indication of the vehicle speed. This integration function is performed by integrator circuit 52, which consists of an operational amplifier 54 in parallel disposition with respect to control capacitor 56. The capacitor 56 is bypassed by a normally closed switch 58. Switch 58 is opened immediately upon application of vehicle brakes and remains open during the braking mode.

The output signal in line 60 thus is an indication of the instantaneous vehicle speed. It is distributed to the input side of an adder circuit 62 and added algebraically to a wheel speed signal in line 64 thereby producing an output signal $V_O$ which is an indication of vehicle slip. This signal may be used as described by Jania and Vanderberg in the aforementioned disclosure to cause a wheel slip control actuator to be energized.

The wheel speed signal is obtained in a manner similar to that described in the Jania and Vanderberg disclosure. It includes a toothed disc 66 drivably connected to one of the wheels of the vehicle. The teeth of the disc, which are formed of magnetic material, pass into and out of registry with respect to the core of an inductance coil 68 thereby inducing a voltage pulse. Each time the inductance field is traversed by a tooth, a voltage pulse is generated and these pulses are distributed to an operational amplifier 70. A frequency-to-voltage converter circuit is connected to the output side of the amplifier 70. The voltage on the output side of converter 72 is distributed to the base of an emitter-follower transistor 74 of the PNP type. The emitter voltage for transistor 74 is always a fixed amount higher than the base voltage. The collector for the transistor 74 is grounded.

The emitter voltage is distributed across a normally closed switch 76 to a storage capacitor 78. Switch 76 is closed at all times except during vehicle braking at which time it is opened thereby isolating capacitor 78.

One side of capacitor 78 is grounded. The other side is connected to the base of the emitter follower transistor 80 of the NPN type. The output voltage at the emitter for the transistor 80 is less than the voltage of the base by a fixed amount, but it is proportional to the speed of the road wheels.

When the switch 76 is closed, the capacitor 78 stores the voltage pulses distributed from the converter 72 and develops a charge. This charge is isolated, however, when the switch 76 is opened. During the braking mode this charge remains relatively constant and induces a so-called memorized voltage that is an indicator of the speed of the vehicle at the time the braking mode is initiated. By comparing this signal with the synthesized vehicle velocity signal, the output signal $V_O$ may be used for control purposes during braking.

The circuit shown in FIG. 1 is self-compensating for those signals that are induced by an uphill or downhill disposition of the vehicle. These normally would introduce a false reading that would indicate either higher or lower deceleration than the actual value that should be recorded. Such compensations occur automatically because the switch 51 is closed at all times except during the operation in the braking mode. The same reference potential then exists at all times on the output side of the control capacitor 40. Changes in the decelerator signal due to uphill or downhill dispositions of the vehicle then do not result in changes in the voltage on the output side of the capacitor 40.

Having thus described a preferred form of my invention, what I claim and desire to secure by U.S. Letters Patent is:

1. In an anti-skid brake system for a wheeled vehicle, a vehicle speed synthesizer comprising a deceleration sensor carried by the vehicle, said deceleration sensor comprising a piezoelectric material, an amplifier circuit connected to the output side of the deceleration sensor whereby the voltage signals induced by the piezoelectric material due to the inertia forces acting thereon are distributed to said amplifier circuit, a first control capacitor having one side thereof connected to one side of said piezoelectric material, a high input impedance transistor in said amplifier circuit having its input side connected to said one side of said first control capacitor, an integrator circuit connected to the output side of said amplifier circuit, a wheel speed pickup adapted to develop a voltage signal proportional in magnitude to wheel speed, a storage capacitor connected to the output side of said pickup, switch means for isolating said capacitor at the initiation of a braking mode, circuit means for comparing the resultant signals developed by said integrator circuit and by said storage capacitor whereby the output voltage thereof is determined by the difference between the storage capacitor voltage and the integrator circuit output voltage, said amplifier circuit comprising a second control capacitor and at least one operational amplifier transistor having a base connected to receive the output signal of said deceleration sensor, the output element of said last named transistor being connected to one side of said second control capacitor, an output transistor having a base connected to the other side of said second control capacitor, a reference voltage source, switch means for connecting said reference voltage source to said other side of said second control capacitor thereby compensating for the base emitter voltage bias of said output transistor thus providing an immediate output response to a change of deceleration.

2. The combination as set forth in claim 1 wherein said operational amplifier transistor has a first voltage source connected to its collector, said output transistor having its emitter connected to the input side of said integrator circuit and its collector connected to said first voltage source.

3. The combination as set forth in claim 2 wherein said switch means includes an additional transistor having a base connected through a resistance to said reference voltage source, paired switch contacts adapted to be opened when the vehicle is braked, the output side of said additional transistor being connected to one switch contact and the other switch contact being connected to the base of said output transistor.

4. The combination as set forth in claim 1 wherein said switch means includes an additional transistor having a base connected through a resistance to said reference voltage source, paired switch contacts adapted to be opened when the vehicle is braked, the output side of said additional transistor being connected to one switch contact and the other switch contact being connected to the base of said output transistor.

References Cited
UNITED STATES PATENTS

| | | | |
|---|---|---|---|
| 3,400,284 | 9/1968 | Elazar | 73—517 X |
| 3,401,984 | 9/1968 | Williams et al. | 303—21 BE |
| 3,467,443 | 9/1969 | Okamoto et al. | 303—21 BE |
| 3,498,682 | 3/1970 | Mueller et al. | 303—21 BE |
| 3,482,887 | 12/1969 | Sheppard | 303—21 BE |

FOREIGN PATENTS

| | | | |
|---|---|---|---|
| 501,650 | 4/1954 | Canada | 73—133 D |

OTHER REFERENCES

British specification No. 763,226, December 1956, Great Britain, Snowden, Class 73–133 D, pp. 1–3.

MILTON BUCHLER, Primary Examiner

S. G. KUNIN, Assistant Examiner

U.S. Cl. X.R.

73—503; 188—181 C; 307—235; 317—5; 324—161; 328—146